(12) United States Patent
Takano

(10) Patent No.: US 6,700,368 B2
(45) Date of Patent: Mar. 2, 2004

(54) METHOD AND PROGRAM FOR ANALYZING CHARACTERISTICS OF A MAGNETIC TRANSDUCER

(75) Inventor: Ken-ichi Takano, Tokyo (JP)

(73) Assignee: TDK Corporation, Tokyo (JP)

( * ) Notice: Subject to any disclaimer, the term of this patent is extended or adjusted under 35 U.S.C. 154(b) by 1 day.

(21) Appl. No.: 10/192,541

(22) Filed: Jul. 11, 2002

(65) Prior Publication Data

US 2003/0083832 A1 May 1, 2003

(30) Foreign Application Priority Data

Jul. 16, 2001 (JP) .................................. 2001-215270

(51) Int. Cl.[7] ............................................ G01R 33/12
(52) U.S. Cl. ...................................... 324/210; 324/252
(58) Field of Search ............................. 324/210, 211, 324/212, 252; 360/77.09, 75; 714/718; 702/115; 29/603.09

(56) References Cited

U.S. PATENT DOCUMENTS 5,898,549 A * 4/1999 Gill ...................... 360/324.11
6,400,535 B1 * 6/2002 Shimazawa et al. ... 360/324.11

OTHER PUBLICATIONS

K. Fujiwara, "Lecture on Magnetic Measurement VI Computer Stimulation", Journal of Japanese Applied Magnetism Institute, vol. 25, No. 3–1, pp. 133–148, 2001.

Ken–ichi Takano, et al., "Read Sensitivity in Abutted–Junction Type Spin–Valve Head", IEEE Transactions on Magnetics, vol. 34, No. 4, pp. 1516–1518, Jul., 1998.

Yoshinobu Nakatani, et al., "Direct Solution of the Landau–Lifshitz–Gilbert Equation for Micromagnetics", Japanese Journal of Applied Physics, vol. 28, No. 12, pp. 2485–2507, Dec., 1989.

* cited by examiner

*Primary Examiner*—N. Le
*Assistant Examiner*—Reena Aurora
(74) *Attorney, Agent, or Firm*—Armstrong, Kratz, Quintos, Hanson & Brooks, LLP

(57) ABSTRACT

A method of analyzing characteristics of a magnetic transducer includes sub-dividing a region to be analyzed in a magnetic transducer into a plurality of polyhedral elements, and performing a transient calculation. The transient calculation includes calculating a transient electric field of each polyhedral element, calculating a transient magnetic field of each polyhedral element, and updating the magnetic permeability in accordance with a magnetic flux density determined from the calculated transient magnetic field. The steps of performing transient calculation are repeated until a predetermined number of time steps have been completed, in order to determine electric fields and magnetic fields of all of the plurality of polyhedral elements in the region to be analyzed.

13 Claims, 9 Drawing Sheets

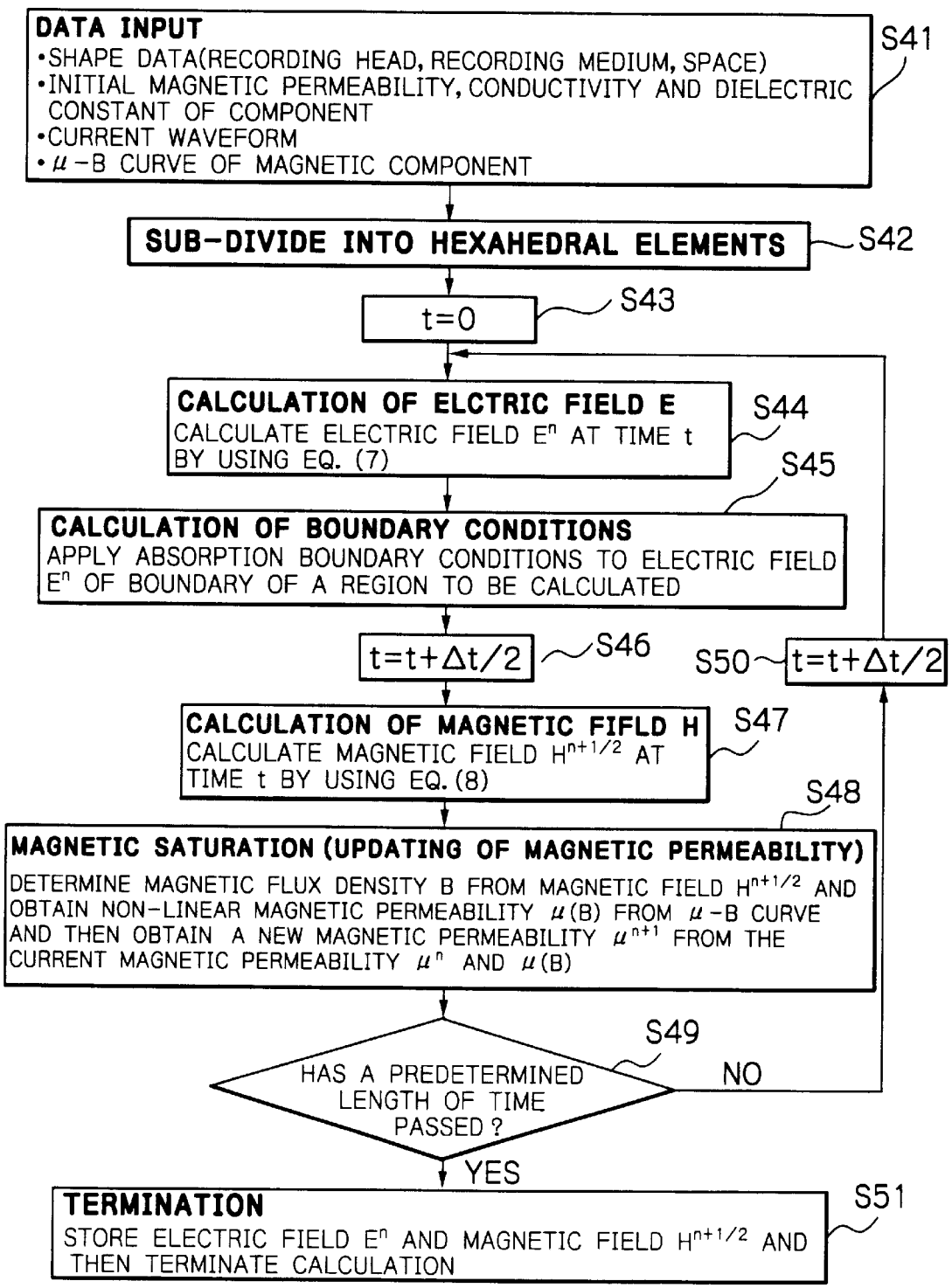

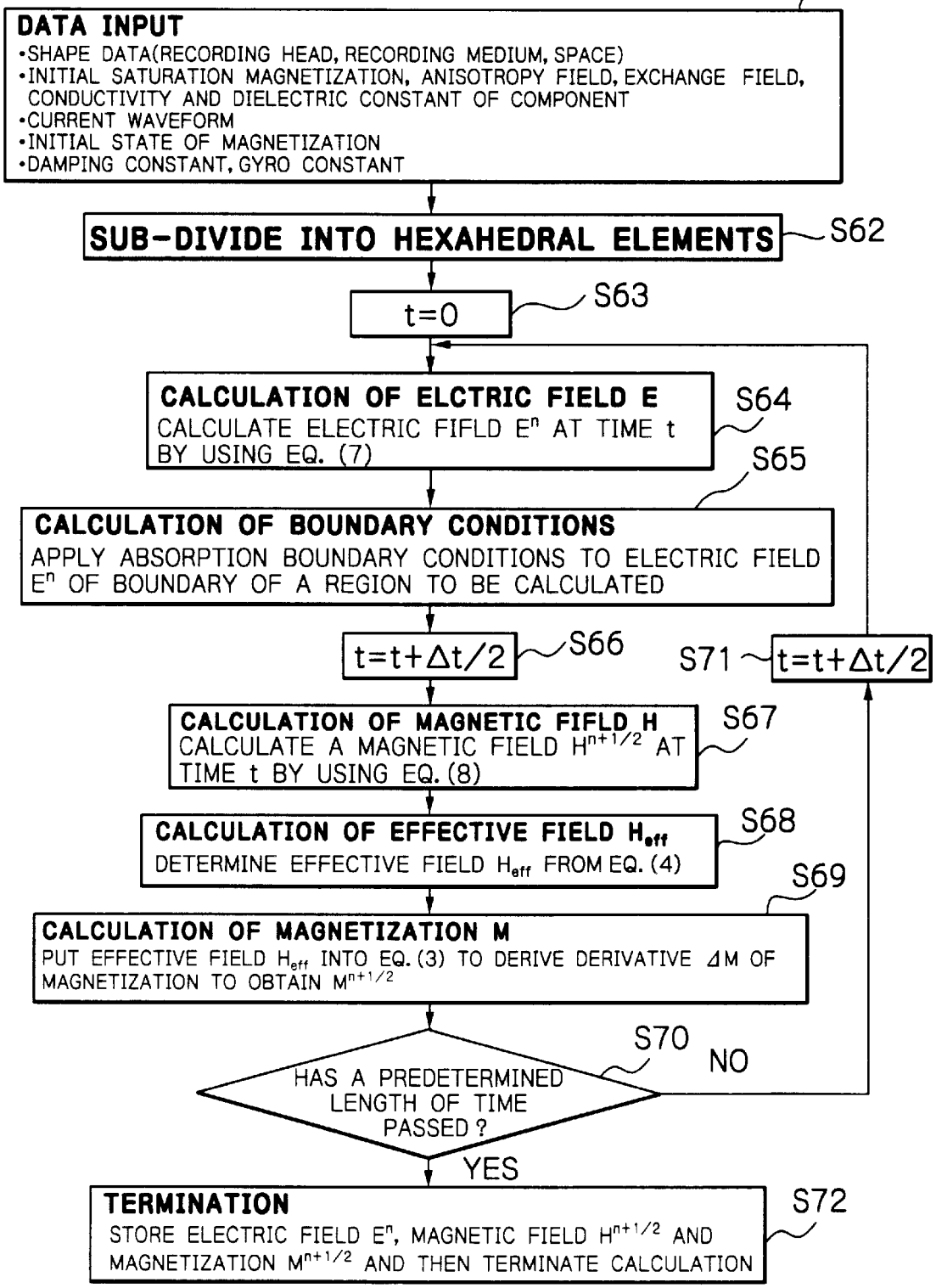

METHOD AND PROGRAM FOR ANALYZING CHARACTERISTICS OF A MAGNETIC TRANSDUCER

FIELD OF THE INVENTION

The present invention relates to a method for analyzing characteristics of a magnetic transducer such as an electromagnetic field characteristics and an magnetization characteristics of a magnetic transducer such as an inductive magnetic recording head for example.

DESCRIPTION OF THE RELATED ART

With the recent widespread use of personal computers, networked information is rapidly increasing. Such information includes not only conventional numerical data but also, for example, image data, and the volume of the information is increasing dramatically. Handling such an enormous amount of information requires a high-speed MPU as well as a high-speed, large-capacity, and high-reliability hard disk system.

When information is recorded magnetically on a recording medium such as a hard disk, a magnetic head having a coil wound around a soft magnetic material is used. With a so-called longitudinal recording medium that has an easy axis of magnetization in an in-plane direction, recording is achieved by the use of a leakage magnetic flux from a minute gap between two magnetic poles of a magnetic head made of a soft magnetic material. For this reason, the recording performance of a magnetic recording medium depends greatly not only on the characteristics of the medium but also on various factors that influence the recording magnetic field.

The factors that influence the recording magnetic field include primarily a film for protecting a magnetic medium and a head, a thickness of lubricant layer, a recess of a head magnetic pole, a magnetic spacing between the head and the medium that is determined by a floating height of the head, a length of a gap, magnetic poles, a magnetomotive force of a coil, and ICs and electrical circuits of a recording driver. Among these factors, a shape, magnetic characteristics, and magnetization structure of the head magnetic poles are important parameters in designing a magnetic head.

Conventionally, the design of a magnetic head often uses analysis based on a computer simulation. Computer-based analysis is used for performing an accurate, quick and quantitative analysis. This type of computer simulation has been a predominant tool in designing a magnetic head (Journal of Japanese Applied Magnetism Institute, Vol. 25, No. 3–1, pp.133–148, 2001).

In the design of a magnetoresistive effect (MR) read head, magnetic analysis is performed by using a micro-magnetic simulation (IEEE Trans Magn., Vol. 34, No. 4, p1516, 1998). For anisotropic magnetoresistive effect (AMR) heads, this method divides only an MR film and its soft adjacent layer (SAL) into elements, and for spin valve MR heads, only free layer and pin layer into elements. Then, based on an effective magnetic field that is the sum of a static magnetic field, an anisotropic magnetic field, an exchange magnetic field, and an external magnetic field, the Landau-Lifshitz-Gilbert (LLG) equation is solved for the magnetization in the elements (Jpn. J. Appl. Phys., 28, p2485, 1989). In this method, the static magnetic field calculation of which is the most time-consuming is determined by an integral equation method (IEM).

For the analysis of a magnetic recording head, only electromagnetic field analysis is performed by using finite element method (FEM), finite difference time domain method (FDTD method), integral equation method (IEM), or boundary element method, but no magnetization analysis is executed because a time required for this calculation is too long to complete analysis.

For an MR read head, only a very thin film is discreted, which has a pattern size of about 1 $\mu m^2$ and a thickness of no more than 0.1 $\mu m$. Therefore, the calculation of a static magnetic field requires only a small-scale calculation that involves elements of an order of 1000, so that a time required for calculating the static magnetic field is very short. In contrast to this, for a magnetic recording head, magnetic poles of a complex shape with a pattern size of several tens $\mu m^2$ and a thickness of the order of micro meters are divided into elements, so that the number of the elements is enormous ranging from several tens thousand to several hundreds thousand. Moreover, in order to consider eddy current effect, the depth of skin of a magnetic body should be expressed. Thus, it is inevitable that the region is divided into even smaller elements, and therefore the calculation of static magnetic field requires a longer time for each cycle of calculation for the magnetic recording head.

When the magnetization M in a steady state is calculated, the magnetization M is required to be calculated one by one self consistently and the static magnetic field needs to be calculated every time the magnetization M is updated. When the static magnetic field is calculated by the IEM that is used in the micromagnetic simulation, the time required for calculating the static magnetic field is proportional to $N^3$, N being the number of elements. Thus, repetitively effecting the IEM calculation every time the magnetization is updated takes an enormous time for one-time calculation of magnetization unless each cycle of the calculation of the static magnetic field is short. Thus, for a magnetic recording head, the time required for calculation is so long that even a today's super computer is not enough. For this reason, magnetization analysis that requires multiple calculations of static magnetic field is not carried out. Thus, for the magnetic recording head, only an electromagnetic field analysis that requires a smaller number of magnetic field calculations is performed.

However, the shape of magnetic poles and magnetic characteristics such as anisotropy and magnetostriction of the magnetic poles determine magnetization structure, and influence the ability of the magnetic recording head seriously, so that analysis in terms of magnetization has been desired in analyzing a magnetic recording head.

SUMMARY OF THE INVENTION

It is therefore an object of the invention to provide a method and a program for analyzing characteristics that are capable of analyzing the magnetization of a magnetic transducer such as a magnetic recording head.

According to the present invention, a method for analyzing characteristics of a magnetic transducer includes a step of sub-dividing a region to be analyzed, in a magnetic transducer into a plurality of polyhedral elements, based on at least data representing a shape of the region in the magnetic transducer, and a step of performing a transient calculation. The transient calculation includes calculating a transient electric field of each of the plurality of polyhedral elements by using a conductivity and a dielectric constant of each of the plurality of polyhedral elements, a transient electric field of each of the plurality of polyhedral elements, calculated at one preceding time step ($\Delta t$), a transient magnetic field of each of the plurality of polyhedral elements, calculated at ½ preceding time step ($\Delta t/2$), and a current density of each of the plurality of polyhedral elements, calculated at ½ preceding time step (Δt/2), calculating a transient magnetic field of each of the plurality of polyhedral elements by using a transient magnetic field of each of the plurality of polyhedral elements, calculated at one preceding time step (Δt), a transient electric field of each of the plurality of polyhedral elements, calculated at ½ preceding time step (Δt/2), and a magnetic permeability of each of the plurality of polyhedral elements, and updating the magnetic permeability in accordance with a magnetic flux density determined from the calculated transient magnetic field. The step of performing transient calculation is repeated until a predetermined number of time steps have been completed, to determine electric fields and magnetic fields of all of the plurality of polyhedral elements in the region to be analyzed.

For each of polyhedral elements, a transient electric field and a magnetic field are calculated one alternately with the other by shifting ½ of time step on the basis of the current density of each polyhedral element and material constants including a magnetic permeability of each polyhedral element. In this manner, electric fields and magnetic fields of all polyhedral elements in a region to be analyzed are determined, and the magnetic permeability is updated in accordance with a magnetic flux density determined from the magnetic field calculated each time. This updated magnetic permeability is used to calculate a magnetic field at the following time step. By this method, the electric field can be analyzed taking magnetic saturation into account.

It is preferred that the step of performing transient calculation includes determining a magnetic flux density of each of the plurality of polyhedral elements from the calculated transient magnetic field, and updating the magnetic permeability to a magnetic permeability obtained from a magnetic flux density using a predetermined magnetic permeability-magnetic flux density characteristic.

It is also preferred that the step of performing transient calculation includes providing secondary absorption boundary conditions to the calculated transient electric field at a boundary of the region to be analyzed, by using the transient electric field calculated at two preceding time steps (2Δt) and the transient electric field calculated at one preceding time step (Δt).

It is preferred that the transient electric field $E^n$ is calculated by $$E^n = \frac{1 - \frac{\sigma \Delta t}{2\varepsilon}}{1 + \frac{\sigma \Delta t}{2\varepsilon}} E^{n-1} + \frac{\frac{\Delta t}{\varepsilon}}{1 + \frac{\sigma \Delta t}{2\varepsilon}} \nabla \times H^{n-1/2} - \frac{\frac{\Delta t}{\varepsilon}}{1 + \frac{\sigma \Delta t}{2\varepsilon}} J^{n-1/2}$$

where $\sigma$ is the conductivity, $\varepsilon$ is eth dielectric constant, $\Delta t$ is a time step, $H^{n-1/2}$ is a magnetic field at ½ preceding time step and $J^{n-1/2}$ is a current density at ½ preceding time step.

It is also preferred that the transient magnetic field $H^{n+1/2}$ is calculated by $$H^{n+1/2} = H^{n-1/2} - \frac{\Delta t}{\mu} \nabla \times E^n - \frac{\Delta t}{\mu} J_m^n$$

where $\mu$ is the magnetic permeability and $J_m^n$ is a magnetizing current at ½ preceding time step.

According to the present invention further a method of analyzing characteristics of a magnetic transducer, includes a step of sub-dividing a region to be analyzed, in a magnetic transducer into a plurality of polyhedral elements, based on at least data representing a shape of the region in the magnetic transducer, and a step of performing a transient calculation. The transient calculation includes calculating a transient electric field of each of the plurality of polyhedral elements by using a conductivity and a dielectric constant of each of the plurality of polyhedral elements, a transient electric field of each of the plurality of polyhedral elements, calculated at one preceding time step (Δt), a transient magnetic field of each of the plurality of polyhedral elements, calculated at ½ preceding time step (Δt/2), and a current density of each of the plurality of polyhedral elements, calculated at ½ preceding time step (Δt/2), calculating a transient magnetic field of each of the plurality of polyhedral elements by using a transient magnetic field of each of the plurality of polyhedral elements, calculated at one preceding time step (Δt), a transient electric field of each of the plurality of polyhedral elements, at ½ preceding time step (Δt/2), and a magnetizing current corresponding to a magnetization of each of the plurality of polyhedral elements, calculated at one preceding time step (Δt), calculating an effective magnetic field of each of the plurality of polyhedral elements, from the calculated transient magnetic field, and determining a derivative of magnetization of each of the plurality of polyhedral elements, by using the calculated effective magnetic field to calculate a magnetization at that time. The step of performing transient calculation is repeated until a predetermined number of time steps have been completed, to determine electric fields, magnetic fields and magnetizations of all of the plurality of polyhedral elements in the region to be analyzed.

Electric field E, magnetic field H and magnetization M are obtained simultaneously by using a FDTD method and a LLG equation in such a way that time steps for the FDTD method and the LLG equation are synchronized with each other. In other words, a transient electric field $E^n$ is calculated based on the conductivity σ and the dielectric constant $\varepsilon$ of each of the polyhedral elements, an electric field $E^{n-1}$ of each of the polyhedral elements, calculated at one preceding time step (Δt), a magnetic field $H^{n-1/2}$ of each of the polyhedral elements, calculated at ½ preceding time step (Δt/2), and a current density $J^{n-1/2}$ of each of the polyhedral elements, at ½ preceding time step (Δt/2). Then, a transient magnetic field $H^{n+1/2}$ of each of polyhedral elements is calculated on the basis of a transient magnetic field $H^{n-1/2}$ of each of the polyhedral elements, calculated at one preceding time step (Δt), a transient electric field $E^n$ of each of the polyhedral elements, calculated at ½ preceding time step (Δt/2), and a magnetizing current $J_m^n$ determined from a magnetization of each of the polyhedral elements, calculated at one preceding time step (Δt).

As mentioned previously, the method of calculating magnetic field includes finite element method (FEM), finite difference time domain method (FDTD method), and integral equation method (IEM). As listed in Table 1, the time required for calculation is proportional to $N^3$ for the IEM where N is the number of elements, N×bandwidth (BW) for the FEM, and $N^{4/3}$ for the FDTD method.

TABLE 1

| Calculation method | Time required for calculation | Matrix | Division into elements |
|---|---|---|---|
| Finite element method (FEM) | N × BW | Symmetry sparse matrix | Region is divided into elements |
| Finite | $N^{4/3}$ | Symmetry | Region is divided |

TABLE 1-continued

| Calculation method | Time required for calculation | Matrix | Division into elements |
|---|---|---|---|
| difference time domain method (FDTD method) | | sparse matrix | into elements |
| Integral equation method (IEM) | $N^3$ | Asymmetry full matrix | Only regions of magnetic body and dielectric body are divided into elements |

Thus, in the FDTD method, an increase in calculation time is minimum when the number of elements is increased, i.e., the FDTD method requires less calculation time than conventional methods and is practical.

In the IEM and the FEM, an electromagnetic field at steady state is determined at a certain time. In the FDTD method, transient states of electromagnetic field are calculated one by one at respective time steps until the calculation arrives at a certain value. In other words, the basic equations of the FDTD method are expressed in terms of derivatives of electric field and magnetic field with respect to time as shown in Equations (1) and (2).

$$\frac{\partial E}{\partial t} = -\frac{\sigma}{\varepsilon}E + \frac{1}{\varepsilon}\nabla \times H - \frac{1}{\varepsilon}J \quad (1)$$

$$\frac{\partial H}{\partial t} = -\frac{1}{\mu}\nabla \times E - \frac{1}{\mu}J_m \quad (2)$$

These equations indicate that the rotation of a magnetic field creates an electric field, and the rotation of an electric field creates a magnetic field. Here, σ is a conductivity, ε is a dielectric constant, $\mu$ is a magnetic permeability, J is a current density and $J_m$ is a magnetizing current.

When magnetization is calculated in micromagnetics, the LLG equation in the form of Equation (3) is used. Here, ΔM is a derivative of magnetization, α is a damping constant, γ is a gyro constant, M is a magnetization, $H_{eff}$ is an effective magnetic field given by Equation (4), H is a transient magnetic field calculated by the FDTD method and is a sum of static magnetic field and current magnetic field, $H_k$ is anisotropy magnetic field, and $H_{ex}$ is exchange magnetic field.

$$(1+\alpha^2)\frac{\partial M}{\partial t} = -|\gamma|(M \times H_{eff}) - \frac{\alpha|\gamma|}{M}[M \times (M \times H_{eff})] \quad (3)$$

$$H_{eff} = H + H_k + H_{ex} \quad (4)$$

The LLG equation is also expressed in terms of a derivative of magnetization with respect to time, and transient states require to be calculated one by one in order to determine a value in the steady state which is a final state. Thus, by using Equations (1) to (3) as calculus of finite difference, the time step of the FDTD method and the LLG equation are synchronized, so that the electric field E, magnetic field H, and magnetization M may be solved. By using the thus obtained electric field E, magnetic field H, magnetization M, and gyro constant, ferromagnetic resonance frequency can be determined. As mentioned above, the present invention provides the transient states and steady states of electric field E, magnetic field H, and magnetization M, and ferromagnetic resonance frequency.

It is preferred that the step of performing transient calculation includes providing secondary absorption boundary conditions to the calculated transient electric field at a boundary of the region to be analyzed, by using the transient electric field calculated at two preceding time steps (2Δt) and the transient electric field calculated at one preceding time step (Δt).

It is also preferred that the transient electric field $E^n$ is calculated by $$E^n = \frac{1 - \frac{\sigma \Delta t}{2\varepsilon}}{1 + \frac{\sigma \Delta t}{2\varepsilon}}E^{n-1} + \frac{\frac{\Delta t}{\varepsilon}}{1 + \frac{\sigma \Delta t}{2\varepsilon}}\nabla \times H^{n-1/2} - \frac{\frac{\Delta t}{\varepsilon}}{1 + \frac{\sigma \Delta t}{2\varepsilon}}J^{n-1/2}$$

where σ is the conductivity, ε is eth dielectric constant, Δt is a time step, $H^{n-1/2}$ is a magnetic field at ½ preceding time step and $J^{n-1/2}$ is a current density at ½ preceding time step.

It is further preferred that the transient magnetic field $H^{n+1/2}$ is calculated by $$H^{n+1/2} = H^{n-1/2} - \frac{\Delta t}{\mu}\nabla \times E^n - \frac{\Delta t}{\mu}J_m^n$$

where $\mu$ is the magnetic permeability and $J_m^n$ is a magnetizing current at ½ preceding time step.

It is preferred that a derivative ΔM of the magnetization is calculated by $$(1+\alpha^2)\frac{\partial M}{\partial t} = -|\gamma|(M \times H_{eff}) - \frac{\alpha|\gamma|}{M}[M \times (M \times H_{eff})]$$

where α is a damping constant, γ is a gyro constant, $H_{eff}$ is the effective magnetic field and M is the magnetization.

It is also preferred that the effective magnetic field $H_{eff}$ is calculated by $H_{eff} = H + H_k + H_{ex}$, where H is the calculated transient magnetic field, $H_k$ is an anisotropy magnetic field and $H_{ex}$ is an exchange magnetic field.

According to the present invention, further, a program for analyzing characteristics of a magnetic transducer brings a computer into a function of sub-dividing a region to be analyzed, in a magnetic transducer into a plurality of polyhedral elements, based on at least data representing a shape of the region in the magnetic transducer, and a function of performing a transient calculation. The transient calculation includes calculating a transient electric field of each of the plurality of polyhedral elements by using a conductivity and a dielectric constant of each of the plurality of polyhedral elements, a transient electric field of each of the plurality of polyhedral elements, calculated at one preceding time step (Δt), a transient magnetic field of each of the plurality of polyhedral elements, calculated at ½ preceding time step (Δt/2), and a current density of each of the plurality of polyhedral elements, calculated at ½ preceding time step (Δt/2), calculating a transient magnetic field of each of the plurality of polyhedral elements by using a transient magnetic field of each of the plurality of polyhedral elements, calculated at one preceding time step (Δt), a transient electric field of each of the plurality of polyhedral elements, calculated at ½ preceding time step (Δt/2), and a magnetic permeability of each of the plurality of polyhedral elements, and updating the magnetic permeability in accordance with a magnetic flux density determined from the calculated transient magnetic field. The function of performing transient calculation is repeated until a predetermined number of time steps have been completed, to determine electric fields and magnetic fields of all of the plurality of polyhedral elements in the region to be analyzed.

According to the present invention, still further, a program for analyzing characteristics of a magnetic transducer brings a computer into a function of sub-dividing a region to be analyzed, in a magnetic transducer into a plurality of polyhedral elements, based on at least data representing a shape of the region in the magnetic transducer, and a function of performing a transient calculation. The transient calculation includes calculating a transient electric field of each of the plurality of polyhedral elements by using a conductivity and a dielectric constant of each of the plurality of polyhedral elements, a transient electric field of each of the plurality of polyhedral elements, calculated at one preceding time step ($\Delta t$), a transient magnetic field of each of the plurality of polyhedral elements, calculated at ½ preceding time step ($\Delta t/2$), and a current density of each of the plurality of polyhedral elements, calculated at ½ preceding time step ($\Delta t/2$), calculating a transient magnetic field of each of the plurality of polyhedral elements by using a transient magnetic field of each of the plurality of polyhedral elements, calculated at one preceding time step ($\Delta t$), a transient electric field of each of the plurality of polyhedral elements, at ½ preceding time step ($\Delta t/2$), and a magnetizing current corresponding to a magnetization of each of the plurality of polyhedral elements, calculated at one preceding time step ($\Delta t$), calculating an effective magnetic field of each of the plurality of polyhedral elements, from the calculated transient magnetic field, and determining a derivative of magnetization of each of the plurality of polyhedral elements, by using the calculated effective magnetic field to calculate a magnetization at that time. The function of performing transient calculation is repeated until a predetermined number of time steps have been completed, to determine electric fields, magnetic fields and magnetizations of all of the plurality of polyhedral elements in the region to be analyzed.

Further objects and advantages of the present invention will be apparent from the following description of the preferred embodiments of the invention as illustrated in the accompanying drawings.

BRIEF DESCRIPTION OF THE DRAWINGS

FIG. 4 is a flowchart illustrating an example of an electromagnetic field-calculating algorithm based on FDTD method that takes magnetic saturation into account, with respect to a magnetic recording head of the embodiment of FIG. 1;

FIG. 6 is a flowchart illustrating an example of an electromagnetic field and magnetization calculating algorithm based on the FDTD method, with respect to the magnetic recording head of the embodiment of FIG. 1;

DESCRIPTION OF THE PREFERRED EMBODIMENTS

Figure 1:
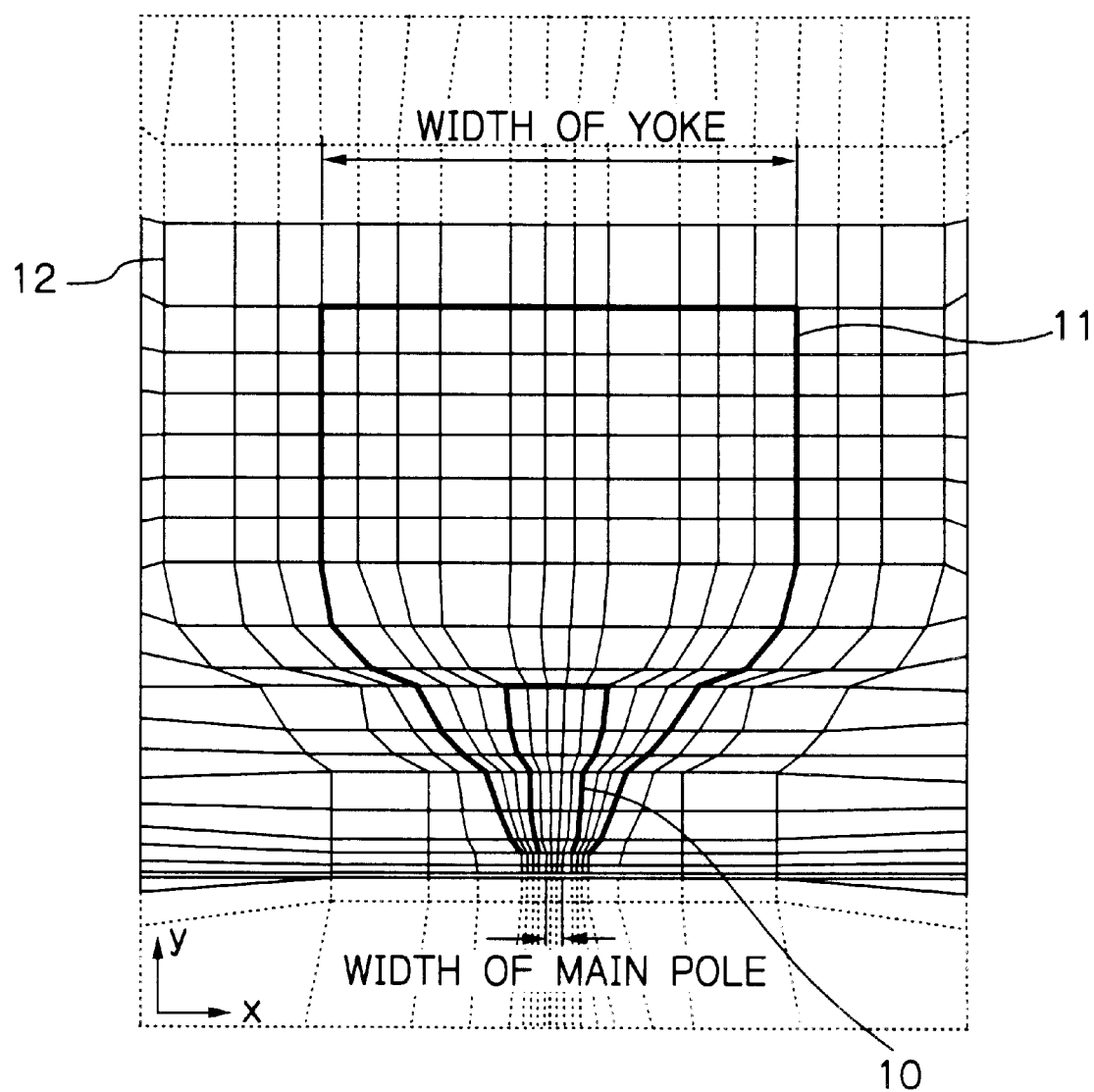
FIG. 1 is a front view schematically illustrating, as a preferred embodiment according to the present invention, a model for analyzing an electromagnetic field and a magnetization of a single pole recording head used in perpendicular magnetic recording.
Figure 2:
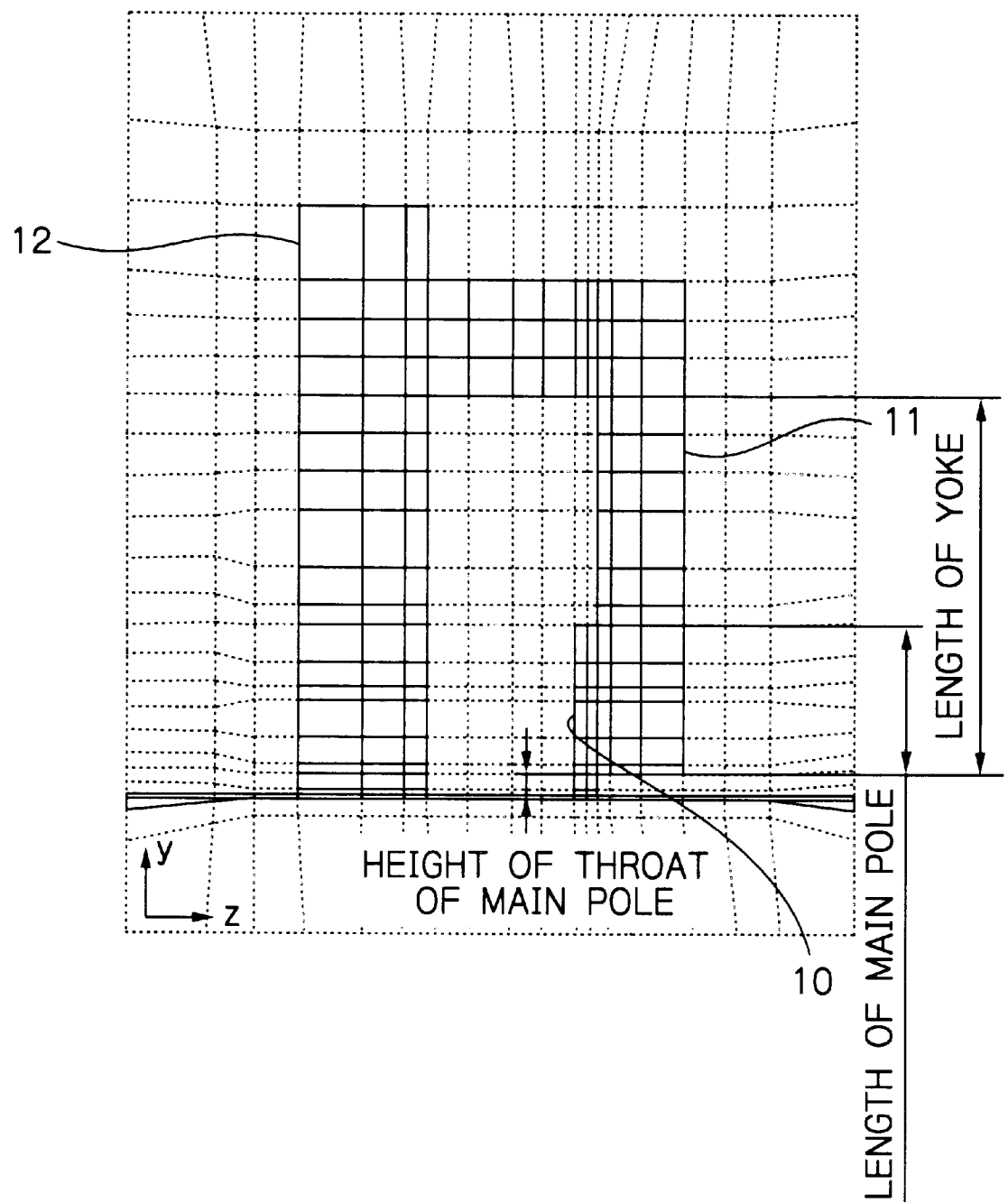
FIG. 2 is a side view illustrating the model of FIG. 1.

FIGS. 1 and 2 schematically illustrate a model for analyzing electromagnetic field and magnetization of a single pole recording head used in perpendicular magnetic recording, as a preferred embodiment according to the present invention.

Referring to these figures, reference numerals 10 denotes a main pole section of a recording head, 11 denotes its yoke section, and 12 denotes its return section, respectively. The main pole section 10, yoke section 11 and return section 12 are made of a magnetic material to form a magnetic pole. The recording head also includes a coil, not shown, made of a nonmagnetic conductive material. A magnetic recording medium has a back layer made of a soft magnetic material and spaced apart from the main pole section 10 of the recording head by a distance equal to a thickness of a recording layer plus the spacing.

Table 2 lists parameters of respective components of the recording head and the back layer of the recording medium in this embodiment.

TABLE 2

| | | | |
|---|---|---|---|
| Main pole section | Size | Width:<br>Thickness:<br>Length:<br>Throat height: | 0.3 $\mu$m<br>0.4 $\mu$m<br>2.5 $\mu$m<br>0.5 $\mu$m |
| | Saturation magnetization M | 1500 emu/cm$^3$ | |
| | Relative magnetic permeability $\mu_r$ | 1000 or 1 (isotropy) | |
| | Conductivity $\sigma$ | 2 × 10$^6$ S/m | |
| | Relative dielectric constant $\epsilon_r$ | 1 | |
| Yoke section | Size | Width:<br>Thickness:<br>Length: | 7.0 $\mu$m<br>1.5 $\mu$m<br>6.0 $\mu$m |
| | Saturation magnetization M | 800 emu/cm$^3$ | |
| | Relative magnetic permeability $\mu_r$ | 1000 or 1 (isotropy) | |
| | Conductivity $\sigma$ | 2 × 10$^6$ S/m | |
| | Relative dielectric constant $\epsilon_r$ | 1 | |
| Return section | Size | Width:<br>Thickness:<br>Length: | 14.0 $\mu$m<br>3.0 $\mu$m<br>10.0 $\mu$m |
| | Saturation magnetization M | 800 emu/cm$^3$ | |
| | Relative magnetic permeability $\mu_r$ | 1000 or 1 (isotropy) | |
| | Conductivity $\sigma$ | 2 × 10$^6$ S/m | |
| | Relative dielectric constant $\epsilon_r$ | 1 | |
| Back | Size | Thickness: | 0.05 $\mu$m |

TABLE 2-continued

| layer of recording medium | Saturation magnetization M | 800 emu/cm³ |
|---|---|---|
| | Relative magnetic permeability $\mu_r$ | 500 (isotropy) |
| | Conductivity σ | 5 × 10⁵ S/m |
| | Relative dielectric constant $\epsilon_r$ | 1 |

Figure 3:
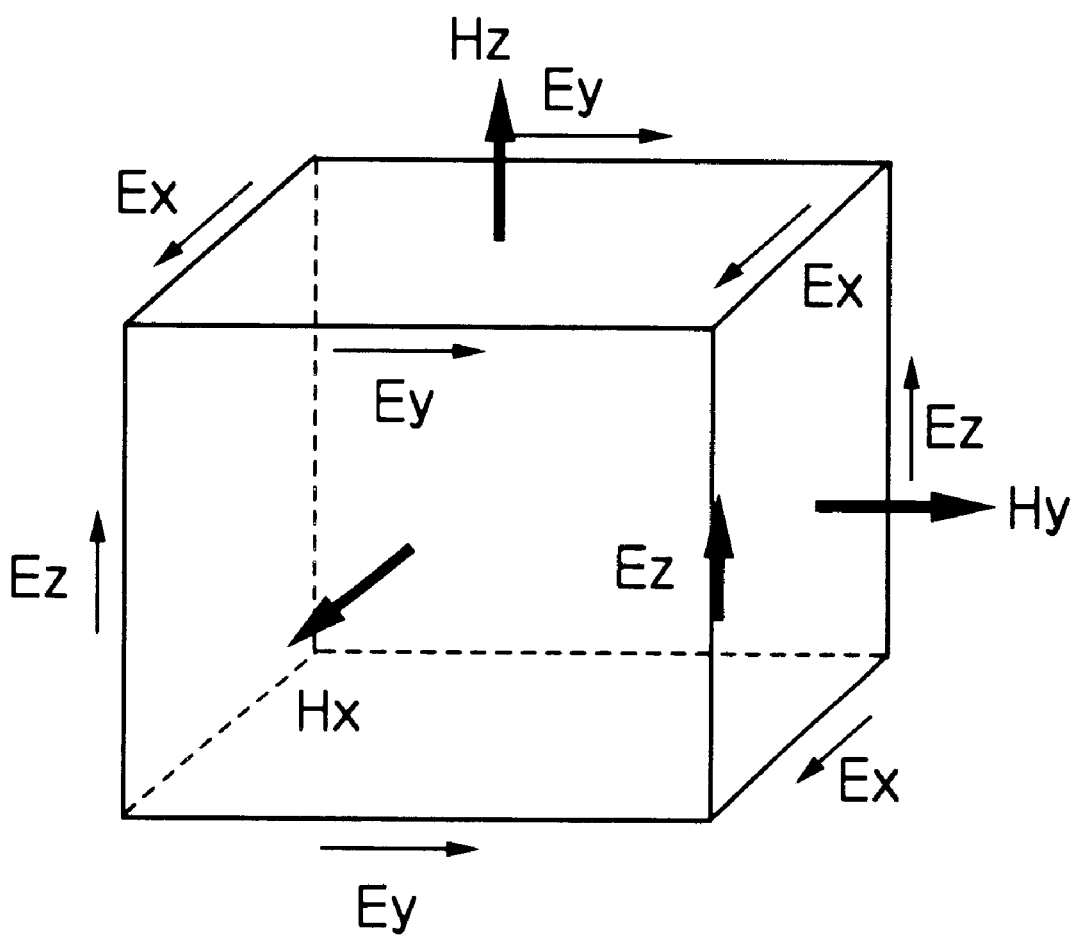
FIG. 3 illustrates an arrangement of the electric field and the magnetic field in a unit element of the embodiment of FIG. 1.

All the magnetic material sections and electrically conductive material sections of the recording head and spaces around them are subdivided into a multiple of polyhedral elements such as tetrahedral elements or hexahedral elements, so that an unknown electric field E is defined on the edges of each element and an unknown magnetic field H is defined on the surfaces of each element. FIG. 3 illustrates an example of the arrangement of electric field and magnetic field of a unit element (lattice).

In the FDTD method, an electric field E and a magnetic field H are calculated alternately one by one, with a time difference of a half of a time step Δt/2 and a spatial difference of a half of a lattice length Δd/2. The respective elements shown in FIGS. 1 and 2 are assumed to be homogeneous, isotropic, and non-dispersive. In other words, the respective elements have the same, fixed conductivity σ, dielectric constant ε, and magnetic permeability μ. The derivatives of electric field E and magnetic field H with respect to time can be expressed by centered difference equation as follows:

$$\frac{\partial E}{\partial t}\bigg|_{t=(n-1/2)\Delta t} = \frac{E^n - E^{n-1}}{\Delta t} \quad (5)$$

$$\frac{\partial H}{\partial t}\bigg|_{t=n\Delta t} = \frac{H^{n+1/2} - H^{n-1/2}}{\Delta t} \quad (6)$$

Equations (7) and (8) can be obtained by solving equations (1), (2), (5) and (6) for $E^n$ and $H^{n+1/2}$.

$$E^n = \frac{1 - \frac{\sigma \Delta t}{2\varepsilon}}{1 + \frac{\sigma \Delta t}{2\varepsilon}} E^{n-1} + \frac{\frac{\Delta t}{\varepsilon}}{1 + \frac{\sigma \Delta t}{2\varepsilon}} \nabla \times H^{n-1/2} - \frac{\frac{\Delta t}{\varepsilon}}{1 + \frac{\sigma \Delta t}{2\varepsilon}} J^{n-1/2} \quad (7)$$

$$H^{n+1/2} = H^{n-1/2} - \frac{\Delta t}{\mu} \nabla \times E^n - \frac{\Delta t}{\mu} J_m^n \quad (8)$$

Therefore, an electric field $E^n$ is calculated based on an electric field $E^{n-1}$ at one preceding time step, a magnetic field $H^{n-1/2}$ at ½ preceding time step, and a current density $J^{n-1/2}$ at ½ preceding time step. Further, a magnetic field $H^{n+1/2}$ at ½ following time step can be calculated based on the calculated electric field $E^n$, a magnetizing current $J_m^n$, and the magnetic field $H^{n-1/2}$ at ½ preceding time step.

Then, an effective magnetic field $H_{eff}$ is calculated from the sum (Equation (4)) of the thus obtained magnetic field $H^{n+1/2}$, an anisotropy magnetic field $H_k$ and an exchange magnetic field $H_{ex}$. By using the thus calculated effective magnetic field $H_{eff}$, a damping constant α and a gyro constant γ, a derivative ΔM of magnetization is calculated by using the LLG equation shown in Equation (3). As a result, a magnetization M can be obtained.

FIG. 4 illustrates an example of an electromagnetic field-calculating algorithm based on FDTD method that takes magnetic saturation into account, with respect to a magnetic recording head of this embodiment.

First, inputted are shape data of a region to be calculated, which region contains a recording head, a recording medium and a space, a magnetic permeability μ of each component, a conductivity σ of each component, a dielectric constant ε of each component, and a magnetic permeability-magnetic flux density curve (μ-B curve) of each magnetic material component. Also, a current waveform that is a source of electromagnetic field, is inputted into a coil (step S41).

Then, based on the inputted shape data, the respective components are sub-divided into small hexahedral elements by automatic calculation (step S42).

Initialization of time t is performed by setting time t to t=0 (step S43) and then a transient electric field $E^n$ at a ½ following time step, i.e., t=Δt/2, is calculated based on the conductivity σ, the dielectric constant ε and a present current density $J^{n-1/2}$ by using Equation (7) (step S44).

At the first routine, the updating process of electric field (step S45) according to the boundary conditions is skipped and time t is incremented by Δt/2 so that t=Δt (step S46).

Then, a transient magnetic field $H^{n+1/2}$ at t=Δt is calculated by using Equation (8) based on the electric field $E^n$ obtained at step S44 and the magnetic permeability μ (step S47).

Then, a magnetic flux density $B^{n+1/2}$ is determined from the calculated magnetic field $H^{n+1/2}$ to obtain a non-linear magnetic permeability μ (B) from the μ-B curve that has been inputted (step S48). A magnetic field calculation routine after Δt uses a magnetic permeability $\mu^{n+1}$ that is updated by $\mu^{n+1}=(1-\beta) \mu^n+\beta\mu$ (B) based on the current magnetic permeability $\mu^n$ and the obtained non-linear magnetic permeability μ (B). It should be noted that β is a relaxation constant in a range of 0<β≦1.

Then, it is judged whether a predetermined length of time has passed or not, i.e. whether a predetermined number of time steps have been completed or not (step S49). If it is judged as NO, time t is incremented by Δt/2 so that t=t+Δt/2 (step S50).

Then, a transient electric field $E^n$ is calculated by using Equation (7) based on the conductivity σ, the dielectric constant ε, an electric field $E^{n-1}$ at one preceding time step Δt, a magnetic field $H^{n-1/2}$ at ½ preceding time step (Δt/2) and a current density $J^{n-1/2}$ at ½ preceding time step (step S44).

In order to prevent reflection of the electric field $E^n$ at a boundary of calculation region, the electric field $E^n$ is updated by applying secondary absorption boundary conditions based on an electric field $E^{n-2}$ at two preceding time steps 2Δt and an electric field $E^{n-1}$ at one preceding time step Δt (step S45).

Thereafter, time t is incremented by Δt/2 so that t=t+Δt (step S46), and then a transient magnetic field $H^{n+1/2}$ at time t is calculated by using Equation (8) based on the magnetic field $H^{n-1/2}$ at one preceding time step Δt, the electric field $E^n$ at ½ preceding time step (Δt/2) obtained at step S44, and the updated magnetic permeability $\mu^{n+1}$ (step S47).

Then, a magnetic flux density $B^{n+1/2}$ is determined from the thus calculated magnetic field $H^{n+1/2}$, and a non-linear magnetic permeability μ (B) is obtained from the inputted μ-B curve (step S48). In magnetic field calculation routine after Δt, a magnetic permeability updated by this non-linear magnetic permeability μ (B) is used.

Then, whether a predetermined length of time has passed, i.e. whether a predetermined number of time steps have been completed is judged (step S49). If it is judged as NO, time t is incremented by Δt/2 and steps S44–S50 are repeated. If it is judged as YES, namely it is judged that a predetermined length of time has passed, i.e. a predetermined number of time steps have been completed, the electric field $E^n$ at the predetermined time and magnetic field $H^{n+1/2}$ are stored and then the program ends (step S51).

The aforementioned electromagnetic field calculation algorithm based on the FDTD method allows easy analysis of electromagnetic field, taking magnetic saturation into account.

Figure 5B:
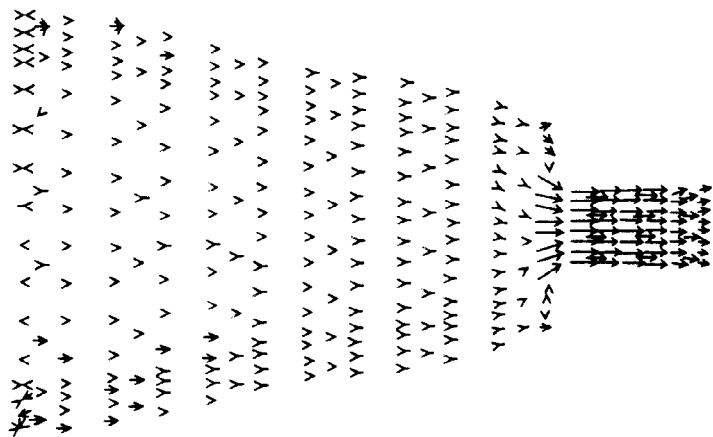
FIGS. 5a and 5b are vector diagrams illustrating magnetic flux density distributions of a recording head, determined by using the electromagnetic field calculating algorithm shown in FIG. 4.
Figure 5A:
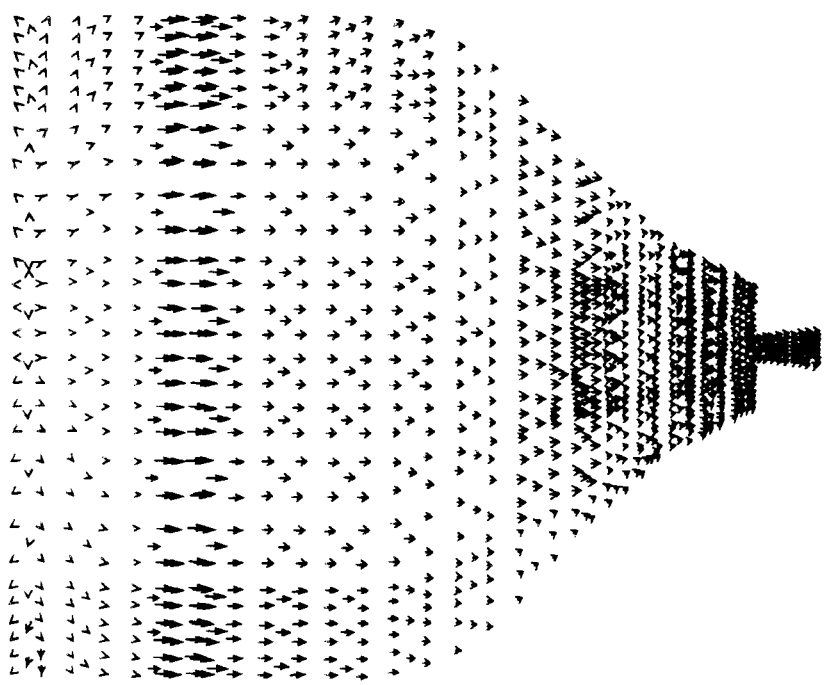

FIGS. 5a and 5b show vector diagrams (x-y plane) illustrating magnetic flux density distributions of a vertical single pole recording head combined with a vertically dual-layered magnetic recording medium, determined by using the electromagnetic field calculating algorithm shown in FIG. 4. Particularly, FIG. 5a illustrates the yoke section and main pole section, and FIG. 5b illustrates an enlarged view of the main pole section. It should be noted that these figures indicate a state when a time of 250 ps has lapsed after a current with a waveform having a rise time of 200 ps is inputted. The magnetic flux density in both the yoke section and the main pole section is observed primarily only in a direction of height (y direction).

FIG. 6 illustrates an example of an electromagnetic field and magnetization calculating algorithm based on the FDTD method, with respect to the magnetic recording head of the embodiment of FIG. 1.

First, inputted are shape data of a region to be calculated, which region contains a recording head, a recording medium and a space, a magnetic permeability $\mu$ of each component, a conductivity $\sigma$ of each component, a dielectric constant $\epsilon$ of each component, and an anisotropy magnetic field $H_k$ of each magnetic material component and an exchange magnetic field $H_{ex}$ of each magnetic material component. Also, a current waveform that is a source of electromagnetic field, is inputted into a coil. Here, the magnetic permeability $\mu$ of the magnetic material components is assumed as $\mu=1$, i.e., a magnetic permeability in vacuum. Then, a damping constant $\alpha$, a gyro constant $\gamma$ and an initial magnetization $M_{init}$ are set for the LLG equation (step S61).

Then, based on the inputted shape data, the respective components are sub-divided into small hexahedral elements by automatic calculation (step S62).

Initialization is performed by setting time t to t=0 (step S63) and then a transient electric field $E^n$ at ½ following time step, i.e., t=$\Delta$t/2, is calculated based on the conductivity $\sigma$, dielectric constant $\epsilon$ and a present current density $J^{n-1/2}$ by using Equation (7) (step S64).

At the first routine, the updating process of electric field (step S65) according to the boundary conditions is skipped and time t is incremented by $\Delta$t/2 so that t=$\Delta$t (step S66).

Then, a transient magnetic field $H^{n+1/2}$ at t=$\Delta$t is calculated by using Equation (8) based on the electric field $E^n$ obtained at step S64 and on the magnetizing current $J_m$ due to an initial magnetic magnetization $M_{init}$ (step S67).

Then, an effective magnetic field $H_{eff}$ is calculated from the sum (Equation 4) of the thus calculated magnetic field $H^{n+1/2}$, the anisotropy magnetic field $H_k$ and the exchange magnetic field $H_{ex}$ (step S68).

Then, a derivative $\Delta M$ of magnetization is calculated by using the LLG equation of Equation (3), and a magnetization $M^{n+1/2}$ at this time is calculated from $M^{n+1/2}=M_{init}+\Delta M$ (step S69).

Then, it is judged whether a predetermined length of time has passed or not, i.e., whether a predetermined number of time steps have been completed or not (step S70). If it is judged as NO, time t is incremented by $\Delta$t/2 so that t=t+$\Delta$t/2 (step S71).

Then, a transient electric field $E^n$ at time t is calculated by using Equation (7) based on the conductivity $\sigma$, the dielectric constant $\epsilon$, an electric field $E^{n-1}$ at one preceding time step $\Delta$t, a magnetic field $H^{n-1/2}$ at ½ preceding time step ($\Delta$t/2) and a current density $J^{n-1/2}$ at ½ preceding time step ($\Delta$t/2) (step S64).

In order to prevent reflection of the electric field $E^n$ at the boundary of a region to be calculated, the electric field $E^n$ is updated by applying secondary absorption boundary conditions based on an electric field $E^{n-2}$ at two preceding time steps 2$\Delta$t and an electric field $E^{n-1}$ at one preceding time step $\Delta$t (step S65).

Thereafter, time t is incremented by $\Delta$t/2 so that t=t+$\Delta$t/2 (step S66), and then a transient magnetic field $H^{n+1/2}$ at time t is calculated by using Equation (8) based on the magnetic field $H^{n-1/2}$ at one preceding time step $\Delta$t, the electric field $E^n$ at ½ preceding time step ($\Delta$t/2) obtained at step S64 and a magnetization current $J_m^n$ resulting from the magnetization $M^{n-1/2}$ at one preceding time step $\Delta$t (step S67).

Then, an effective magnetic field $H_{eff}$ is calculated from the sum (Equation (4)) of the thus calculated magnetic field $H^{n+1/2}$, the anisotropy magnetic field $H_k$ and the exchange magnetic field $H_{ex}$ (step S68).

Then, the derivative $\Delta M$ of magnetization is determined by using the LLG equation of Equation (3) and a magnetization $M^{n+1/2}$ at this time is calculated from $M^{n+1/2}=M_{init}+\Delta M$ (step S69).

Then, whether a predetermined length of time has passed or not, i.e. whether a predetermined number of time steps have been completed or not, is judged (step S70). If it is judged as NO, time t is incremented by $\Delta$t/2 and steps S64–S71 are repeated. If it is judged as YES, namely it is judged that a predetermined length of time has passed, i.e. a predetermined number of time steps have been completed, the electric field $E^n$ at that predetermined time, the magnetic field $H^{n+1/2}$ and the magnetization $H^{n+1/2}$ are stored and the program ends (step S72).

A ferromagnetic resonance frequency is determined from the gyro constant $\gamma$ and an effective magnetic field that is perpendicular to the magnetization.

Figure 7B:
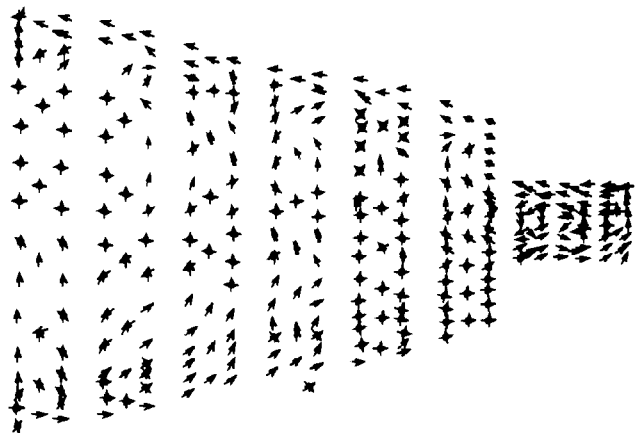
FIGS. 7a and 7b are vector diagrams illustrating magnetization distributions under a residual magnetization state, determined by using the electromagnetic field and magnetization calculating algorithm of FIG. 6.
Figure 7A:
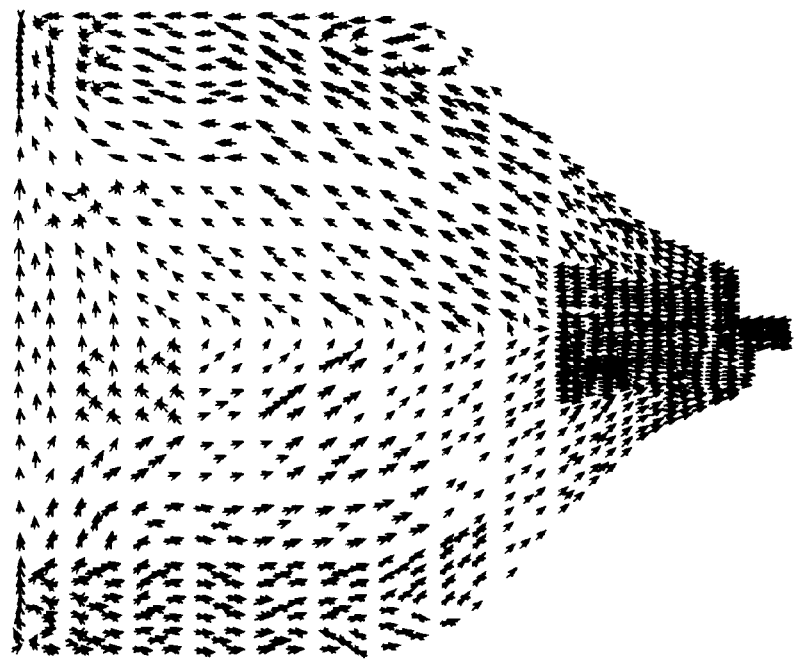
Figure 8D:
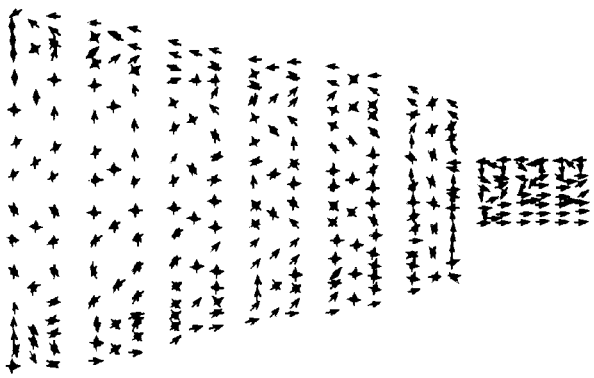
FIGS. 8a–8d are vector diagrams illustrating magnetization distributions in transitional states of a main pole section, where this main pole section under the residual magnetization state of FIGS. 7a and 7b is magnetized by energization of a coil.
Figure 8C:
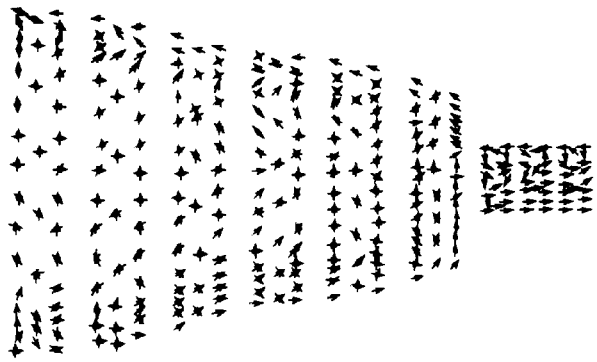
Figure 8B:
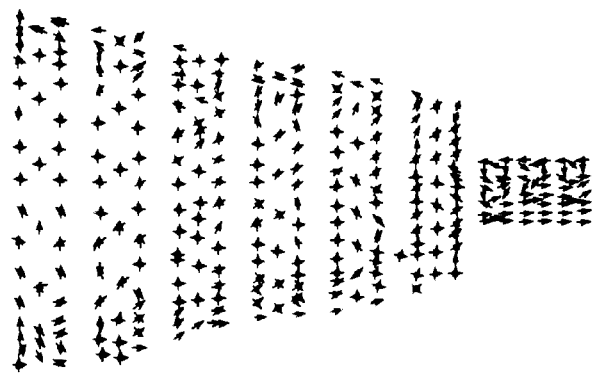
Figure 8A:
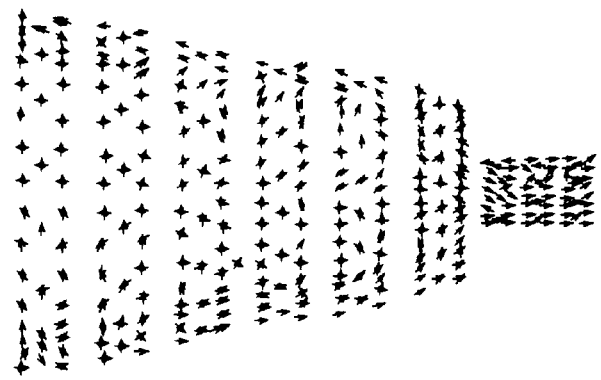

FIGS. 7a and 7b show vector diagrams (x-y plane) illustrating magnetization distribution of residual magnetization state (from initial condition to relaxed condition) of a vertical single pole recording head combined with a vertical two-layer magnetic recording medium. The magnetization distribution is determined by using an electromagnetic field and a magnetization calculation algorithm based on the FDTD method. Particularly, FIG. 7a illustrates the yoke section and main pole section, and FIG. 7b illustrates an enlarged view of the main pole section. As initial conditions, magnetization is all oriented in a direction of track width (+x direction), and the anisotropy magnetic field $H_k$ (10 Oe) is given in a direction of height (y direction) for the yoke section and in a direction of track (x direction) for the main pole section. Due to the fact that the magnetization at the end of the yoke section is oriented in a direction parallel to the end edge so as to create no magnetic pole and to the fact that the anisotropy magnetic field $H_k$ is oriented in a direction of height, a magnetic domain structure is provided in the yoke section so that the magnetic domains in different heights are oriented anti-parallel at the left and right sides with each other. Most of the residual magnetization in the main pole section is oriented in a direction of the width of track in its protion with a larger width, but describes eddies in a direction of height at its tip portion. The eddy structure at the tip region is also observed when seen from the ABS side (x-z plane).

FIGS. 8a–8d show magnetization distribution vector diagrams illustrating a transient state from the residual magnetization state shown in FIGS. 7a and 7b to a state in which the main pole section is magnetized by energizing the coil. Here, the damping constant a is set to 1 and the gyro constant $\gamma$ to 1.76×10$^7$ rad/(s·Oe). In a residual magnetization state of FIG. 8a, the magnetic domains describe eddies at the tip portion of the main pole section to create no magnetic pole. It is observed that as the coil is energized, the main pole is magnetized in the order of FIG. 8b, FIG. 8c and FIG. 8d while the eddies at the tip portion comes loose gradually.

Figure 9:
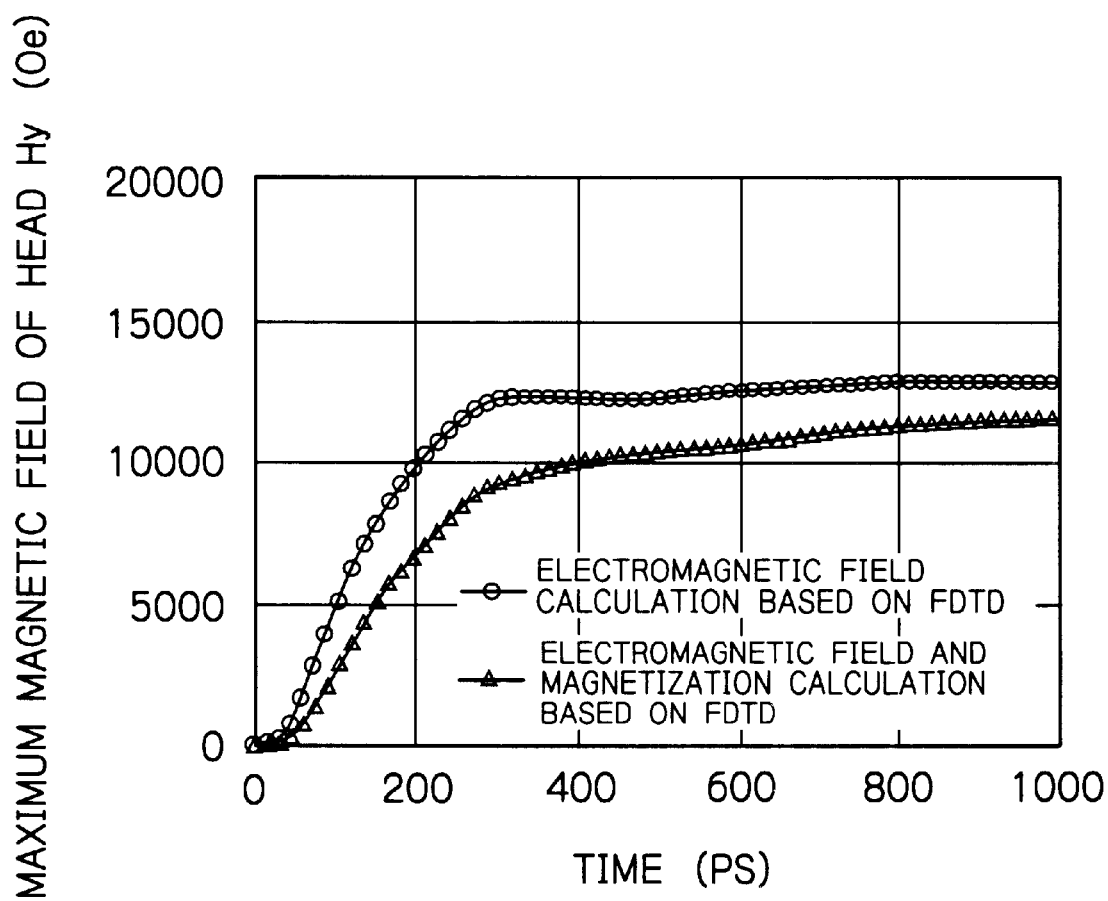
FIG. 9 is a graph illustrating changing characteristics in the maximum head magnetic field of a recording head at a surface of a recording medium with respect to time, the characteristics being determined by using the electromagnetic field calculating algorithm based on the FDTD method of FIG. 4 and by using the electromagnetic field and magnetization calculating algorithm of FIG. 6.

FIG. 9 illustrates changes in head maximum magnetic field on the surface of the recording head that faces the surface of the recording medium, determined by using the FDTD electromagnetic field calculation algorithm of FIG. 4, and by using the FDTD electromagnetic field and magnetization calculation algorithm of FIG. 6.

The calculation of electromagnetic field based on the FDTD method involves delay of head magnetic field due to the delay of transmission of electromagnetic field based on conductivity (eddy current) and dielectric constant. The calculation of electromagnetic field and magnetization based on the FDTD method involves delay of head magnetic field due to dynamics of electromagnetic field effect and magnetization.

In the aforementioned electromagnetic field and magnetization calculation algorithm based on FDTD method, the FDTD method and the LLG equation are in synchronism with each other in time step. Thus, the electric field E, magnetic field H and magnetization M can be simultaneously solved without difficulty.

While the aforementioned description was given by way of an example of a magnetic transducer in the form of a single magnetic pole recording head for perpendicular magnetic recording, the present invention may also be applicable to other type of magnetic heads as well as magnetic transducer elements other than magnetic heads.

Many widely different embodiments of the present invention may be constructed without departing from the spirit and scope of the present invention. It should be understood that the present invention is not limited to the specific embodiments described in the specification, except as defined in the appended claims.

What is claimed is:

1. A method for analyzing characteristics of a magnetic transducer, comprising the steps of:
    sub-dividing a region to be analyzed, in a magnetic transducer into a plurality of polyhedral elements, based on at least data representing a shape of said region in said magnetic transducer; and
    performing a transient calculation, said transient calculation including:
        calculating a transient electric field of each of said plurality of polyhedral elements by using a conductivity and a dielectric constant of each of said plurality of polyhedral elements, a transient electric field of each of said plurality of polyhedral elements, calculated at one preceding time step ($\Delta t$), a transient magnetic field of each of said plurality of polyhedral elements, calculated at ½ preceding time step ($\Delta t/2$), and a current density of each of said plurality of polyhedral elements, calculated at ½ preceding time step ($\Delta t/2$);
        calculating a transient magnetic field of each of said plurality of polyhedral elements by using a transient magnetic field of each of said plurality of polyhedral elements, calculated at one preceding time step ($\Delta t$), a transient electric field of each of said plurality of polyhedral elements, calculated at ½ preceding time step ($\Delta t/2$), and a magnetic permeability of each of said plurality of polyhedral elements; and
        updating said magnetic permeability in accordance with a magnetic flux density determined from said calculated transient magnetic field,
    said step of performing transient calculation being repeated until a predetermined number of time steps have been completed, to determine electric fields and magnetic fields of all of said plurality of polyhedral elements in said region to be analyzed.

2. The method as claimed in claim 1, wherein said step of performing transient calculation comprises determining a magnetic flux density of each of said plurality of polyhedral elements from the calculated transient magnetic field, and updating said magnetic permeability to a magnetic permeability obtained from a magnetic flux density using a predetermined magnetic permeability-magnetic flux density characteristic.

3. The method as claimed in claim 1, wherein said step of performing transient calculation comprises providing secondary absorption boundary conditions to the calculated transient electric field at a boundary of said region to be analyzed, by using the transient electric field calculated at two preceding time steps ($2\Delta t$) and the transient electric field calculated at one preceding time step ($\Delta t$).

4. The method as claimed in claim 1, wherein the transient electric field $E^n$ is calculated by $$E^n = \frac{1 - \frac{\sigma \Delta t}{2\varepsilon}}{1 + \frac{\sigma \Delta t}{2\varepsilon}} E^{n-1} + \frac{\frac{\Delta t}{\varepsilon}}{1 + \frac{\sigma \Delta t}{2\varepsilon}} \nabla \times H^{n-1/2} - \frac{\frac{\Delta t}{\varepsilon}}{1 + \frac{\sigma \Delta t}{2\varepsilon}} J^{n-1/2}$$

where $\sigma$ is the conductivity, $\varepsilon$ is eth dielectric constant, $\Delta t$ is a time step, $H^{n-1/2}$ is a magnetic field at ½ preceding time step and $J^{n-1/2}$ is a current density at ½ preceding time step.

5. The method as claimed in claim 1, wherein the transient magnetic field $H^{n+1/2}$ is calculated by $$H^{n+1/2} = H^{n-1/2} - \frac{\Delta t}{\mu} \nabla \times E^n - \frac{\Delta t}{\mu} J_m^n$$

where $\mu$ is the magnetic permeability and $J_m^n$ is a magnetizing current at ½ preceding time step.

6. A method for analyzing characteristics of a magnetic transducer, comprising the steps of:
    sub-dividing a region to be analyzed, in a magnetic transducer into a plurality of polyhedral elements, based on at least data representing a shape of said region in said magnetic transducer; and
    performing a transient calculation, said transient calculation including:
        calculating a transient electric field of each of said plurality of polyhedral elements by using a conductivity and a dielectric constant of each of said plurality of polyhedral elements, a transient electric field of each of said plurality of polyhedral elements, calculated at one preceding time step ($\Delta t$), a transient magnetic field of each of said plurality of polyhedral elements, calculated at ½ preceding time step ($\Delta t/2$), and a current density of each of said plurality of polyhedral elements, calculated at ½ preceding time step ($\Delta t/2$);
        calculating a transient magnetic field of each of said plurality of polyhedral elements by using a transient magnetic field of each of said plurality of polyhedral elements, calculated at one preceding time step ($\Delta t$), a transient electric field of each of said plurality of polyhedral elements, at ½ preceding time step ($\Delta t/2$), and a magnetizing current corresponding to a magnetization of each of said plurality of polyhedral elements, calculated at one preceding time step ($\Delta t$);

calculating an effective magnetic field of each of said plurality of polyhedral elements, from the calculated transient magnetic field; and determining a derivative of magnetization of each of said plurality of polyhedral elements, by using the calculated effective magnetic field to calculate a magnetization at that time, said step of performing transient calculation being repeated until a predetermined number of time steps have been completed, to determine electric fields, magnetic fields and magnetizations of all of said plurality of polyhedral elements in said region to be analyzed.

7. The method as claimed in claim 6, wherein said step of performing transient calculation comprises providing secondary absorption boundary conditions to the calculated transient electric field at a boundary of said region to be analyzed, by using the transient electric field calculated at two preceding time steps ($2\Delta t$) and the transient electric field calculated at one preceding time step ($\Delta t$).

8. The method as claimed in claim 6, wherein the transient electric field $E^n$ is calculated by $$E^n = \frac{1 - \frac{\sigma \Delta t}{2\varepsilon}}{1 + \frac{\sigma \Delta t}{2\varepsilon}} E^{n-1} + \frac{\frac{\Delta t}{\varepsilon}}{1 + \frac{\sigma \Delta t}{2\varepsilon}} \nabla \times H^{n-1/2} - \frac{\frac{\Delta t}{\varepsilon}}{1 + \frac{\sigma \Delta t}{2\varepsilon}} J^{n-1/2}$$

where $\sigma$ is the conductivity, $\varepsilon$ is eth dielectric constant, $\Delta t$ is a time step, $H^{n-1/2}$ is a magnetic field at ½ preceding time step and $J^{n-1/2}$ is a current density at ½ preceding time step.

9. The method as claimed in claim 6, wherein the transient magnetic field $H^{n+1/2}$ is calculated by $$H^{n+1/2} = H^{n-1/2} - \frac{\Delta t}{\mu} \nabla \times E^n - \frac{\Delta t}{\mu} J_m^n$$

where $\mu$ is the magnetic permeability and $J_m^n$ is a magnetizing current at ½ preceding time step.

10. The method as claimed in claim 6, wherein a derivative $\Delta M$ of said magnetization is calculated by $$(1 + \alpha^2)\frac{\partial M}{\partial t} = -|\gamma|(M \times H_{\mathit{eff}}) - \frac{\alpha|\gamma|}{M}[M \times (M \times H_{\mathit{eff}})]$$

where $\alpha$ is a damping constant, $\gamma$ is a gyro constant, $H_{\mathit{eff}}$ is the effective magnetic field and M is the magnetization.

11. The method as claimed in claim 6, wherein the effective magnetic field $H_{\mathit{eff}}$ is calculated by $H_{\mathit{eff}} = H + H_k + H_{ex}$, where H is the calculated transient magnetic field, $H_k$ is an anisotropy magnetic field and $H_{ex}$ is an exchange magnetic field.

12. A program for analyzing characteristics of a magnetic transducer, said program containing computer instructions which when executed perform the following steps:

sub-dividing a region to be analyzed, in a magnetic transducer into a plurality of polyhedral elements, based on at least data representing a shape of said region in said magnetic transducer; and performing a transient calculation, said transient calculation including:

calculating a transient electric field of each of said plurality of polyhedral elements by using a conductivity and a dielectric constant of each of said plurality of polyhedral elements, a transient electric field of each of said plurality of polyhedral elements, calculated at one preceding time step ($\Delta t$), a transient magnetic field of each of said plurality of polyhedral elements, calculated at ½ preceding time step ($\Delta t/2$), and a current density of each of said plurality of polyhedral elements, calculated at ½ preceding time step ($\Delta t/2$);

calculating a transient magnetic field of each of said plurality of polyhedral elements by using a transient magnetic field of each of said plurality of polyhedral elements, calculated at one preceding time step ($\Delta t$), a transient electric field of each of said plurality of polyhedral elements, calculated at ½ preceding time step ($\Delta t/2$), and a magnetic permeability of each of said plurality of polyhedral elements; and updating said magnetic permeability in accordance with a magnetic flux density determined from said calculated transient magnetic field, said function of performing transient calculation being repeated until a predetermined number of time steps have been completed, to determine electric fields and magnetic fields of all of said plurality of polyhedral elements in said region to be analyzed.

13. A program for analyzing characteristics of a magnetic transducer, said program containing computer instructions which when executed perform the following steps:

sub-dividing a region to be analyzed, in a magnetic transducer into a plurality of polyhedral elements, based on at least data representing a shape of said region in said magnetic transducer; and performing a transient calculation, said transient calculation including:

calculating a transient electric field of each of said plurality of polyhedral elements by using a conductivity and a dielectric constant of each of said plurality of polyhedral elements, a transient electric field of each of said plurality of polyhedral elements, calculated at one preceding time step ($\Delta t$), a transient magnetic field of each of said plurality of polyhedral elements, calculated at ½ preceding time step ($\Delta t/2$), and a current density of each of said plurality of polyhedral elements, calculated at ½ preceding time step ($\Delta t/2$);

calculating a transient magnetic field of each of said plurality of polyhedral elements by using a transient magnetic field of each of said plurality of polyhedral elements, calculated at one preceding time step ($\Delta t$), a transient electric field of each of said plurality of polyhedral elements, at ½ preceding time step ($\Delta t/2$), and a magnetizing current corresponding to a magnetization of each of said plurality of polyhedral elements, calculated at one preceding time step ($\Delta t$);

calculating an effective magnetic field of each of said plurality of polyhedral elements, from the calculated transient magnetic field; and determining a derivative of magnetization of each of said plurality of polyhedral elements, by using the calculated effective magnetic field to calculate a magnetization at that time, said function of performing transient calculation being repeated until a predetermined number of time steps have been completed, to determine electric fields, magnetic fields and magnetizations of all of said plurality of polyhedral elements in said region to be analyzed.

* * * * *